Nov. 3, 1959    H. R. BRANNON, JR., ET AL    2,911,534
GAMMA RAY SCINTILLOMETER
Filed Aug. 27, 1956
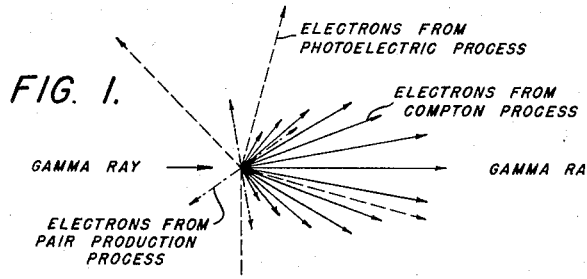
FIG. 1.
FIG. 3.
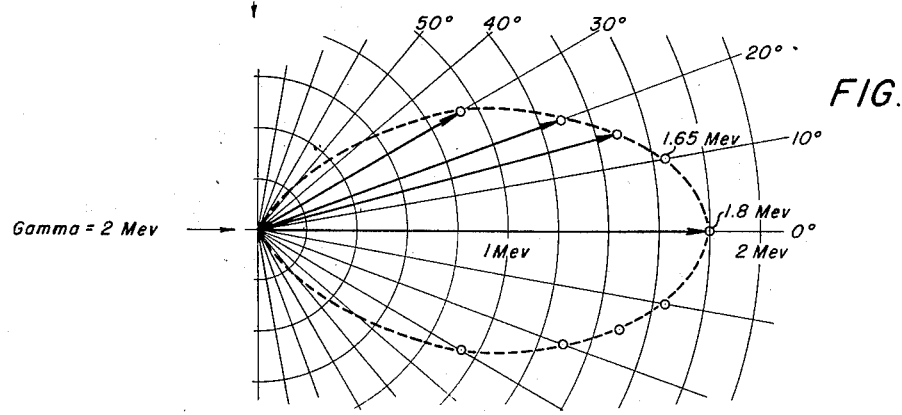
FIG. 2.
FIG. 5
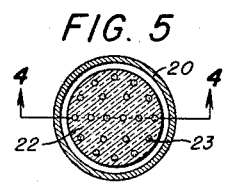
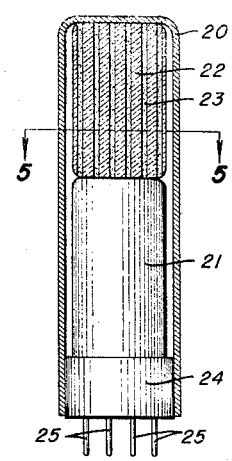
FIG. 4.
FIG. 6.
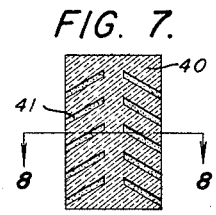
FIG. 7.
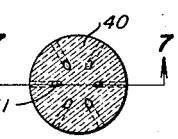
FIG. 8.
INVENTORS.
Hezzie R. Brannon, Jr.,
James A. Rickard,
BY
ATTORNEY.

United States Patent Office 2,911,534
Patented Nov. 3, 1959

2,911,534

GAMMA RAY SCINTILLOMETER

Hezzie R. Brannon, Jr., and James A. Rickard, Bellaire, Tex., assignors, by mesne assignments, to Jersey Production Research Company, Tulsa, Okla., a corporation of Delaware Application April 27, 1956, Serial No. 581,100

7 Claims. (Cl. 250—71)

This invention relates to gamma ray scintillometers. More particularly, this invention relates to a new and useful gamma ray scintillometer and its associated equipment for emphasizing the pulses obtained resulting from Compton electrons having an energy within a specific energy range.

The use of a scintillating crystal or a liquid with associated circuitry as a detector of gamma rays is a common technique of radiation detection. The interaction of gamma rays with scintillating material may be subdivided into three processes:

(1) The photoelectric effect,
(2) Pair production, and
(3) Compton scattering.

In the Compton scattering process a gamma ray strikes a loosely bound or free electron and imparts some of its energy and momentum to the electron. Upon impingement of the gamma ray with the free electron the gamma ray is scattered and the Compton electron is also scattered. The Compton electron is scattered at an angle $\theta$ from 0° to 90° from the line of movement of the original impinging gamma ray.

The energy of the Compton electron is dependent not only upon the energy of the original gamma ray but also upon the angle $\theta$, the energy being greatest for those Compton electrons which make an angle of 0° with the line of motion of the original gamma ray and the energy being least for those Compton electrons making an angle of 90° with the line of motion of the original impinging gamma ray. As gamma rays strike a scintillating material, pulses are produced which are proportional to the energy of the Compton electrons. Hence, the spectrum for a gamma of a single energy is spread out because of the different energies of the recoil electrons resulting from the interaction of the gamma ray with the scintillating material. Hence, when the scintillometer is used for certain purposes as, for example, in nuclear well logging, wherein gamm rays of a multitude of energies coming from various nuclei interact with a scintillating material, the spectrum obtained is so complex as to often make difficult the determination of the Compton peak on the resulting record. The Compton peak can be reduced in spread by the use of various types of pair and coincidence spectrometers, but the circuitry is very complex and the maintenance problems are troublesome. In addition, the efficiency of the scintillometer is usually reduced by one or more orders of magnitude.

When the conventional gamma ray scintillometer is utilized the electrons produced by the photoelectric and pair production effects also contribute to the spectrum resulting in a photoelectric peak and a pair production peak which add to the confusion of the record.

Our invention eliminates or greatly reduces the photoelectric and pair production effects and needs no circuitry in addition to the scintillometer crystal and its associated photomultiplier tubes. Also, our invention sharpens the relatively broad Compton peak and thus makes easier the differentiation of one gamma ray from another.

It is an object, therefore, of our invention to provide the art with a new gamma ray scintillometer which emphasizes a particular energy band of Compton electrons.

It is a further object of this invention to provide the art with a nuclear logging system which emphasizes the Compton electrons having a specific energy range and hence emphasizes the gamma rays for certain specific energies which are emitted from the subsurface formations as a result of being bombarded by a primary radiation particle such as a gamma ray or neutron.

Briefly described, our new scintillometer consists of a photomultiplier tube which has connected thereto an element containing at least one portion thereof of scintillating material. The portion of scintillating material may be substantially cylindrical in shape with the radius of the cylindrical portion being determined by the energy in mev. of Compton electrons having the least energy within the particular energy range selected, the angle $\theta$ of scattering of said least energy electrons, and the density of the scintillating material utilized.

Our new system for nuclear well logging includes a housing adapted to be lowered into a borehole having a source of primary radiation particles disposed therein adapted to bombard the nuclei of elements within the subsurface formations. The resulting emission of gamma rays is detected by means of a transparent member mounted on the housing and exposed to the secondary radiation particles. The transparent member has at least one aperture therein, the axis of the aperture being in the direction of the expected movement of the secondary radiation particle. The aperture is filled with a scintillating material. Electronic equipment is also mounted in the housing for producing electrical pulses having a magnitude proportional to the energies of electrons produced by the reaction of said gammas with the scintillating material. The electrical pulses are conducted to the earth's surface and recorded. The length of the aperture is determined by the expected energy of the gamma rays and the counting efficiency desired and the radius of the aperture is determined by the specific energy range of Compton electrons desired.

Other objects and a fuller understanding of the invention may be had by referring to the following description and claims, taken in conjunction with the accompanying drawings in which:

Fig. 1 is a schematic view showing the usual paths of the Compton electrons, the photoelectric process electrons, and the pair production process electrons resulting from the impingement of the scintillating material by a gamma ray, the lengths of the arrows being proportional to the energy of the corresponding electron.

Fig. 2 is a polar coordinate view showing the energy distribution of the Compton electrons according to the angle of scattering of said electrons resulting from the impingement of a gamma ray upon scintillating material.

Fig. 3 shows a cylinder of scintillating material superimposed upon the electrons of the Compton process shown in Fig. 1 and adapted to explain the manner in which our new scintillometer emphasizes the Compton electrons which have a small angle of scattering to the substantial exclusion of the Compton electrons having a larger angle of scattering.

Fig. 4 is an elevational sectional view of a preferred embodiment of our new gamma ray scintillometer.

Fig. 5 is a view taken along the lines 5—5 of Fig. 4.

Fig. 6 is an elevational view of a borehole showing our new nuclear logging system lowered adjacent specific subsurface formations.

Fig. 7 is an elevational sectional view showing a scintillometer such as might be utilized in the system of Fig. 6.

Fig. 8 is a view taken along the lines 8—8 of Fig. 7.

Referring to the drawings and more particularly to Fig. 1, a gamma ray impinging upon either a scintillating crystal or a scintillating fluid results in the emission of Compton electrons along with photoelectric process electrons and pair production process electrons. The electrons from the photoelectric process and the pair production process are generally scattered at random, the electrons from the photoelectric process being of greater energy than the electrons of the pair production process as shown by the dashed arrows and the dot-dashed arrows, respectively. The Compton electrons, however, are scattered at various angles between 0° and 90° from the line of motion of the impinging gamma ray. An examination of the full line arrows representative of Compton electrons shows clearly that the Compton electrons having a small angle of scattering have a greater energy than those having a larger angle of scattering.

Fig. 2 shows a polar coordinate representation of the energy of Compton electrons according to the angle of scattering. Fig. 2 represents a graphical representation of the energies of Compton electrons resulting from the detection of a gamma ray having an energy of 2 mev. The energy of the Compton electrons according to the angle of scattering and the energy of the detected gamma ray is determined by the fundamental equation:

$$E_b = .511 \times \frac{2E_a^2 \cos^2 \theta}{(E_a + .511)^2 - E_a^2 \cos^2 \theta}$$

wherein $E_b$ equals the energy of the Compton electron in mev., $E_a$ equals the energy of the incident gamma ray in mev. and $\theta$ equals the angle of scattering. According to the above equation if the incident gamma ray has an energy 2 mev., the electrons scattered at a 0° angle have an energy of 1.8 mev. If $\theta$ equals 10°, the energy of the Compton electron equals 1.65 mev. The energy of all of the Compton electrons resulting from an incident 2 mev. gamma ray can be determined in a like manner.

Fig. 3 is included to explain the manner in which our new scintillometer emphasizes the recoil electrons having a specific energy range when compared to the other recoil electrons. As shown when a gamma ray interacts with scintillating material at a point on the axis of a substantially cylindrical shaped member 10, the electrons which have a small angle of scattering will be completely absorbed by the scintillating material 10, whereas the electrons having a large angle of scattering will only be partly absorbed before they move out of the substantially cylindrical member 10. Therefore, the electrons having the small angle of scattering will produce electrical pulses which are in magnitude proportional to the energy of the electrons; however, the electrons having a large angle of scattering will produce electrical pulses which are not proportional to the energy of the electrons because some of the energy of the electrons is expended outside of the confines of the substantially cylindrical member 10. The resulting record obtained using our new gamma ray scintillometer will, therefore, emphasize the recoil electrons within a specific energy band and eliminate or greatly reduce the effect of the Compton electrons outside of the specific energy band. Therefore, the Compton peak will be sharper and hence more easily distinguished as compared to the Compton peaks obtained by conventional gamma ray scintillometers.

Fig. 4 shows a preferred embodiment of a gamma ray scintillometer utilizing the principle of our new invention. Our new scintillometer consists of a light tight enclosure 20 which encloses a photomultiplier tube 21 and a transparent block 22 which may consist of Lucite or any other transparent material. Provided within the block 22 which may be cylindrical in shape are a plurality of apertures 23. Each of the apertures 23 is filled with a scintillating material such as p-terphenyl in xylene. The axis of each of the apertures 23 is arranged parallel to the direction of the incident gamma rays. The cylindrical block member 22 is connected to the photomultiplier tube 21 in a manner so that scintillations produced by the incident gamma rays are detected by the photomultiplier tube. The photomultiplier tube 21 is mounted upon a tube base 24 having the usual leads 25 to electronic circuits.

The length of the apertures 23 should be long enough to cause the recoil electrons of 0 angle scattering to expend all of their energy. The radius of the apertures 23 depends upon the energy in mev. of the Compton electrons having the least energy within the particular energy range desired, the angle of scattering of said least energy electrons from the axes of apertures 23 and the density in grams per cubic centimeters of the scintillating material utilized. For example, if we desire to emphasize radiation in the range 1.65 mev. to 1.8 mev. in preference to lower and higher energy radiations, we would choose an acceptance angle (from the graph of Fig. 2) of 10°. An approximate formula for the radius of the apertures 23 is:

$$r = \frac{(.543E_e - .16) \times \sin A}{d}$$

where $E_e$ equals 1.65 mev. (the energy of the least energy electrons), A is 10° (the angle of scattering of the least energy electrons), and $d$ equals the density of the scintillating material in grams per cubic centimeter. If a xylene solution is utilized having a density of about .88 gram per cubic centimeter the radius of the aperture 23 will equal .145 centimeter.

Our new type gamma ray scintillometer has usefulness in many fields, one being in the field of nuclear well logging. An example of a nuclear well logging system utilizing our new scintillometer is shown in Fig. 6. A housing 30 is lowered into a borehole 31 by means of a cable 32. Included within the housing 30 is a source of primary radiation particles 33 such as a neutron source or a gamma source. A scintillometer 34 is also mounted within housing 30 which would include a scintillating material and a photomultiplier tube with the associated electronic equipment 35 being mounted within housing 30 above the scintillometer. In order to prevent primary radiation particles from impinging upon the scintillometer 34 directly a lead shield 36 may be inserted between the source 33 and scintillometer 34. Primary radiation particles from the source 33 bombard the nuclei of the elements contained within a subsurface formation such as the subsurface formation 37 and shown by the solid arrows. The bombarded nuclei emit secondary radiation particles which would include the gamma rays we desire to detect. Some of these secondary particles will be directed toward the scintillometer 34 as shown by the dotted arrows. The energies of each secondary particle detected by the scintillometer 34 are characteristic of the specific element from which the gamma ray is emitted.

It is desirable that the scintillating material utilized in our new nuclear well logging system be in a position to receive the secondary radiation particles. An example of an appropriate structure for use with the well logging tool shown in Fig. 6 is shown in Figs. 7 and 8. As shown in Figs. 7 and 8, a transparent member 40 has formed therein a plurality of apertures 41, each filled with scintillating material. Each of the apertures 41 is substantially cylindrical in shape and has its axis parallel to the motion of the detected secondary radiation particles. Though one substantially cylindrical aperture 41 may be utilized, a plurality of apertures 41 will preferably be utilized in order to increase the number of secondary radiation particles detected.

Though in Fig. 6 the scintillometer is shown positioned above the source 33 it is to be understood that, if preferred, the scintillometer might be positioned below the source 33. Of course, if the scintillometer 34 is positioned below the source 33 the apertures 41 shown in Fig. 7 would extend from the sides of transparent member 40 downwardly rather than upwardly as shown in Fig. 7.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. A gamma ray scintillometer adapted to emphasize "Compton" electrons of a selected energy range comprising cylindrically configured scintillating means positioned in the path of gamma radiation, the longitudinal axis of said scintillating means extending in the direction of said gamma radiation, the radius of said cylindrical scintillating means being dependent upon the "Compton" electrons having the least energy within said selected energy range, the angle of scattering of said least energy electrons from the axis of said cylinder and the density of said scintillating means, the length of said cylindrical scintillating means being such that the energy of "Compton" electrons having the greatest energy is completely absorbed.

2. A gamma ray scintillometer adapted to emphasize "Compton" electrons of a selected energy range comprising a transparent medium, a plurality of elongated cylindrically configured scintillating means positioned in said transparent medium, the longitudinal axes of said scintillating means extending in the direction of said gamma radiation and being in the path thereof, the radius of each of said cylindrical scintillating means being dependent upon the "Compton" electrons having the least energy within the selected energy range, the angle of scattering of said least energy electrons from the axis of said cylinder and the density of said scintillating means, the length of each of said cylindrical scintillating means being such that the energy of "Compton" electrons having the greatest energy is completely absorbed, means connected to said transparent medium adapted to generate electrical pulses proportional in magnitude to selected energies of the "Compton" electrons and means for recording said pulses.

3. A scintillometer in accordance with claim 2 wherein the radius in centimeters of each of said cylindrically configured scintillating means is approximately defined by the equation $$r = \frac{(.543 E_e - .16) \times \sin A}{d}$$

wherein $E_e$ is the energy in mev. of "Compton" electrons having the least energy within the particular energy range, A is the angle of scattering of said least energy electrons from the axis of said scintillating means and $d$ is the density in grams per cubic centimeters of said scintillating means.

4. A well logging system comprising a source of primary radiation particles adapted to bombard subsurface formations, detecting means adapted to detect secondary radiation particles resulting from the bombardment of said primary radiation particles, said detecting means including a cylindrical transparent member mounted in the borehole, said transparent member having at least one substantially cylindrically configured scintillating means positioned therein, the axis of said scintillating means extending in the direction of movement of said secondary radiation particles, means connected to said transparent member for generating electrical pulses having a magnitude proportional to the energies of said electrons produced by the reaction of said secondary radiation with said scintillating means and means for recording said electrical pulses, the length of said scintillating means being such that energies of "Compton" electrons having the greatest energy is completely absorbed and the radius of said scintillating means being dependent upon the "Compton" electrons having the least energy within the selected energy range, the angle of scattering of said least energy electrons from the axis of said scintillating means and the density of said scintillating means.

5. Apparatus as described in claim 4 wherein said scintillating means includes a plurality of cylindrically configured scintillators, said scintillators being peripherally and vertically spaced apart.

6. Apparatus as described in claim 2 wherein said plurality of scintillating means are peripherally and vertically spaced apart.

7. Apparatus as described in claim 4 wherein the radius in centimeters of the scintillating means is approximately defined by the equation $$r = \frac{(.543 E_e - .16) \times \sin A)}{d}$$

wherein $E_e$ is the energy in mev. of "Compton" electrons having the least energy within the particular energy range, A is the angle of scattering of said least energy electrons from the axis of said scintillating means and $d$ is the density in grams per cubic centimeters of said scintillating means.

References Cited in the file of this patent

UNITED STATES PATENTS

| | | |
|---|---|---|
| 2,689,308 | Land | Sept. 14, 1954 |
| 2,725,484 | McKee | Nov. 29, 1955 |
| 2,733,355 | McKee | Jan. 31, 1956 |